Patented Jan. 27, 1942

2,271,365

UNITED STATES PATENT OFFICE 2,271,365

REFRACTORY FERROUS CHROMITE-ALUMINA CASTING

Theodore E. Field, Louisville, Ky., assignor to Corhart Refractories Company, Louisville, Ky., a corporation of Delaware No Drawing. Application October 11, 1939, Serial No. 299,040

2 Claims. (Cl. 106—66)

In another application of even date I have disclosed cast refractories of ferrous chromite with or without excess chromic oxide. The purpose of the present invention is to cheapen and improve such refractories by addition of alumina to the batch.

Refractories of the present disclosure are to be melted and cast substantially with the techniques disclosed in U. S. Patent #1,615,750 to Fulcher.

Tests have shown that in contact with glass, both cast chromic oxide and cast ferrous chromite are several times as resistant to corrosion as is cast alumina. Nevertheless it has been proposed in making cast refractories to add alumina both to pure chromic oxide and to chrome ore in which ferrous chromite is an important constituent.

When alumina is added to chrome ore the resistance to solution by glass progressively decreases as the amount of alumina increases and the amount of chrome ore decreases. Because of the powerful coloring action of chromic oxide any significant increase in amount of refractory solution is very objectionable in the usual clear glasses. Tests indicate that the harmful effect of alumina on the resistance of chrome ore is due not so much to replacement of ferrous chromite by alumina as it is to conversion of the magnesia in the chrome ore from the resistant magnesium chromite into $MgO.Al_2O_3$ which is poorly resistant. This view is corroborated by the harmful effect of alumina on synthetic magnesium chromite made with pure materials. At any rate I have discovered that contrary to the effect with chrome ore, the addition of alumina to synthetic ferrous chromite has only a minor effect on resistance. Inasmuch as the chromic oxide content is diluted by the alumina, a somewhat greater solubility is required to introduce only the same amount of coloring $Cr_2O_3$. A certain amount of diminution in resistance can therefore be tolerated if the economic gain from including the cheaper alumina compensates for the shorter refractory life. For articles such as feeder rings for which these compositions are useful, the actual length of life is not particularly important as these rings are constantly being changed for different sizes and the only requirement is a minimum of solution during their relatively brief use.

The unexpectedly good resistance of the ferrous chromite refractories to which alumina has been added is apparently associated with the fact that a solid solution of the alumina in the ferrous chromite results. Evidently the resistance of this solid solution is largely conditioned by the ferrous chromite and is therefore superior to what one might expect from a combination of the relatively poor corundum phase with the resistant ferrous chromite phase.

The same phenomenon of superior resistance of a solid solution happens to obtain when refractories are cast from chromic oxide and alumina. The refractories contemplated in the present invention however differ from these in that the cheaper but no less resistant ferrous chromite phase is substituted for the chromic oxide.

Because of the incomplete crystallization of cast refractories produced by usual methods, there is left an amorphous eutectic which in this case consists of $Cr_2O_3$, $FeO$, and $Al_2O_3$. This eutectic is poorer in resistance than the simpler $Cr_2O_3$—$Al_2O_3$ eutectic. It is therefore preferred not to extend the addition of alumina so high that most of the iron oxide appears in the amorphous phase where it contributes nothing to crystal resistance but lowers the glass phase resistance. I prefer accordingly to use not less than 15% iron oxide in any case. From the standpoint of economy, it is further desirable to use the full amount of iron oxide theoretically required to form ferrous chromite with the chromic oxide. While an excess of chromic oxide does not particularly influence the resistance, an excess of iron oxide has a very harmful effect. When iron oxide is kept above 15% to maintain resistance with a significant amount of ferrous chromite phase, the maximum alumina is fixed at 50% by the chromic oxide requirements.

As raw materials one may use the commercial chrome green oxide, Bayer process alumina or similar pure grades, and either black magnetic iron oxide, $Fe_3O_4$, or the red $Fe_2O_3$. The excess oxygen in the latter are an advantage in that they partly counteract the tendency of the graphite electrodes to reduce the metallic oxides during melting. The use of chrome ore is objectionable because of its contribution of attendant magnesia and silica, while the use of bauxite instead of alumina is also objectionable primarily because the silica introduced forms a poor glass phase with the other ingredients and increases the coloring action on clear glasses. However, the requirements are primarily for chemical composition and any equivalent means of obtaining the same analysis in the final casting can be used.

As illustrations of batches which give when melted and cast the novel refractories described, the following may be cited:

1

| Batch | Batch analysis | | |
|---|---|---|---|
| | $Cr_2O_3$ | $Fe_2O_3$ | $Al_2O_3$ |
| 41 chrome green oxide | 41 | | |
| 24 red iron oxide | | 24 | |
| 25 chemical alumina | | | 25 |
| | 41 | 24 | 25 |

2

| Batch | Batch analysis | | |
|---|---|---|---|
| | $Cr_2O_3$ | $Fe_3O_4$ | $Al_2O_3$ |
| 34 chrome green oxide | 34 | | |
| 16 black iron oxide | | 16 | |
| 50 chemical alumina | | | 50 |
| | 34 | 16 | 50 |

3

| Batch | Batch analysis | | |
|---|---|---|---|
| | $Cr_2O_3$ | $Fe_2O_3$ | $Al_2O_3$ |
| 60 chrome green oxide | 60 | | |
| 15 red iron oxide | | 15 | |
| 25 chemical alumina | | | 25 |
| | 60 | 15 | 25 |

What I claim is:

1. A cast refractory containing by chemical analysis from 15 to 30% iron oxide and not over 50% alumina, the remainder being substantially only chromic oxide, without any substantial amount of magnesia and silica.

2. A cast refractory analytically consisting of substantially only oxides of iron, chromium and aluminum and containing by such analysis at least 15% iron oxide and not over 50% alumina, together with sufficient chromic oxide to theoretically form ferrous chromite with the iron oxide and being substantially free of magnesia and silica.

THEODORE E. FIELD.